INVENTOR.
MANFRED E. KUEBLER

Oct. 4, 1966 M. E. KUEBLER 3,277,486
METHOD AND MEANS FOR DAMPING NUTATION IN A SATELLITE
Filed June 12, 1962 2 Sheets-Sheet 2

INVENTOR.
MANFRED E. KUEBLER
BY
ATTORNEYS

United States Patent Office 3,277,486
Patented Oct. 4, 1966

3,277,486
METHOD AND MEANS FOR DAMPING NUTATION IN A SATELLITE
Manfred E. Kuebler, Huntsville, Ala., assignor to the United States of America as represented by the Administrator of the National Aeronautics and Space Administration
Filed June 12, 1962, Ser. No. 202,030
6 Claims. (Cl. 343—705)

The invention described herein may be manufactured and used by or for the Government of the United States of America for governmental purposes without the payment of any royalties thereon or therefor.

This invention relates to a method and means of reducing or damping undesirable motions in free bodies.

More specifically, the invention contemplates the provision of a flexible turnstile-type antenna system for use in a spin-oriented satellite, the antenna mass extension serving to despin the satellite and the flexibility of the antenna being employed to damp satellite nutation after injection into orbit. As used herein, nutation encompasses torque-free body motion induced by initial conditions.

In the very recent past years, the utilization of satellites and space-probes has accelerated quite rapidly, with a consequent and unproportional increase in the jobs to which such bodies are assigned and to the conditions under which such assignments are carried out. As a consequence, the bodies themselves have had to be made lighter and more rugged, while the components of which they are comprised have become more and more sophisticated, one component often requiring a plural utility. Thus these components have had to be fitted within smaller confines, be capable of a greater number of "jobs," yet still be able to withstand the terrific forces to which they are subject.

With the advent of the more powerful boosters and rockets, and consequently more sophisticated, yet overall more cumbersome final "packages," control and stabilization of the bodies has become more and more critical. Such criticality is, of course, manifest in such fields as orientation of the body to permit solar cells to operate efficiently for picture and/or television acquisition and transmission, telemetry acquistiion and transmission, as well as a myriad of other "on board" systems and experiments where orientation at a given time is of primary importance either in acquiring or transmitting the information or in permitting reduction of such information to usable data.

Such stabilization relative to a particular axis of the body is generally obtained by spinning it around that axis. Absent outside forces such an imparted motion is effective to generally align one of the body axes in a particular direction and to prevent the body from tumbling (that is, turning end over end). As long as that axis is aligned in the chosen direction there is said to be true spin and the kinetic energy of rotation (E) of the body is equal to the kinetic energy of rotation at true spin ($E_s$). An addition or subtraction of energy from the body about some other axis will cause an imbalance between E and $E_s$ and, depending on the shape of the body, result in a cyclical displacement of the spin axis from the chosen position. This movement, known as nutation, will continue until enough energy is added to or subtracted from the system to again bring E and $E_s$ into balance.

The change in energy level can occur in any of several ways. For example, while the satellite remains connected to the last stage, a flexing of internal parts or friction in bearings will consume mechanical energy. This lowers the energy level of the body such that E and $E_s$ become unbalanced commencing nutation which continues in the satellite even after separation. While the satellite is orbiting it may be struck by small meteoroids the impact of which might raise the energy level of the system as described above and cause nutation. Another possible source of change in energy level is the force produced when the satellite is separated from the last stage. The causes and effects of nutation are well understood in the art as is the desirability of damping out such a movement.

The frequency of nutation with respect to a fixed axis is:

$$v = \left(1 - \frac{I_s}{I_x}\right) W_s$$

where:

$I_s/I_x$ = ratio of moments of inertia about the axis of movement
$W_s$ = angular velocity about the spin axis The angle of nutation with respect to a fixed axis is:

$$tgl = \frac{\sqrt{\Delta E / E_s}}{\left(\frac{I_s}{I_x} - 1\right) - \Delta E / E_s}$$

where:

$l$ = angle of nutation
$\Delta E / E_s$ = ratio of the change in kinetic energy of rotation to the kinetic energy of rotation at true spin
$I_s/I_x$ = ratio of moments of inertia about the axis of movement In the highly complicated probes in use now and to be used in the future, with their myriad working parts and components and requirements for stability and precise positioning in relation to other objects, nutational motion is obviously not only undesirable, but can be fatal to the assigned mission. Thus, it is of utmost and critical importance that this undesirable motion be eliminated. Yet it is also of utmost importance that the means by which this objective is achieved be as economical and as light as possible, take up an absolute minimum of space in such a manner that it does not interfere with other components or their functions, and concomitantly attain the highest degree of reliability and control accuracy of which it can be capable.

It is this undesirable nutational motion which this invention is designed to meet, and it does so in a highly simple and reliable manner with an accurate and rugged construction which meets all of the criteria set forth above in a highly successful and efficient manner.

Among prior art methods for overcoming nutation, the primary interest has been devoted to damping such motion in gyroscopes. In such environment, the two basic methods employed include energy dissipating mechanical means which use a spring or wire on which is mounted an inertia member, a vibratory motion being imparted thereto on gyro nutational motion, this motion of the inertia member and wire (or spring) causing the dissipation of some of the mechanical energy, thus damping the motion. It is also known to employ a ball inertia element within a housing in the gyro housing so that the gyro nutation is transmitted to the ball, causing the ball to ride up the side of the ball housing and oscillate at an equal and opposite frequency to the nutation, thus damping out the motion. In addition, systems employing mercury as a dampener have been utilized. However, each of the above enumerated, as well as all other known damping means, are subject to a basic and inherent disadvantage in that they all entail additional weight and volume and are usable only for one specific function, as well as requiring additional mechanical systems subject to malfunction. These disadvantages become absolutely objectionable and fatal when applied in a satellite environment as discussed above.

According to the present invention, the foregoing and other disadvantages are obviated by employing a satellite antenna system as the nutation damping means without adding in any respect to the weight, size, volume or complexity of the system. This is accomplished very simply by utilizing an unwinding, flexible antenna having the desired electrical characteristics and a high hysteresis. Nutational motion of the body will cause the unwound or extended wires to oscillate, the wires thus dissipating energy. Such dissipation will act to damp out both the nutation as well as the wire oscillation. This energy dissipation rate can be increased by additional means such as the addition of tip weights on the antenna wires without any basic increase in weight. Thus, it is apparent that a highly efficient, simple, inexpensive and dependable means has been devised for correcting nutation in satellites without additional weight or volume increase, or complicating mechanical systems.

Other objects and many attendant advantages will be apparent from the following detailed description when taken together with the accompanying drawings, in which.

Figure 1:
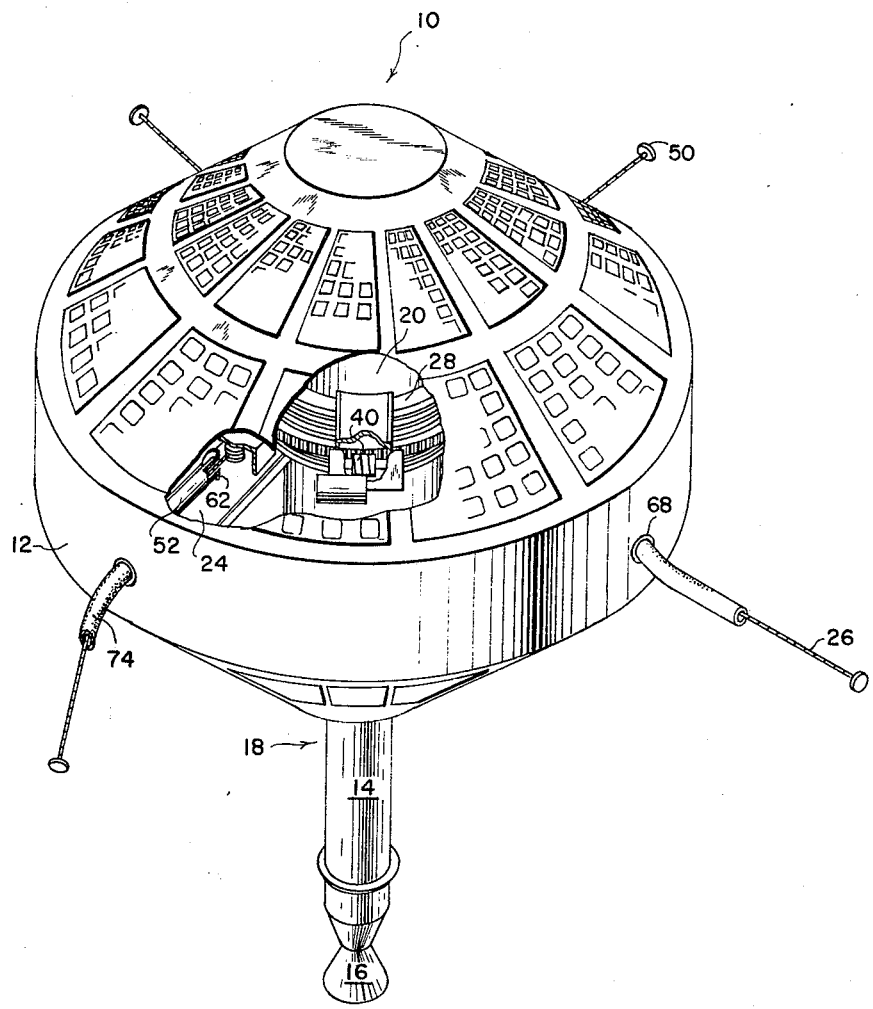
FIGURE 1 is a general perspective view of a satellite embodying the present invention, with portions thereof broken away.

Referring first to FIGURE 1, there is shown a satellite body, indicated generally by the numeral 10. The body includes a shroud 12, and is shown with the last stage 14 still attached thereto. As seen, stage 14 has a conventional rocket motor 16, and is separable from the satellite body 10 at jointure 18 by any conventional means (not shown) such as detonatable parts, springs, etc. FIGURE 1 indicates the antenna system generally by the reference numeral 20, which antenna system is positioned on cylindrical positioning means 22, this means being secured within, and forming an integral part of the satellite body 10 and concentric with the satellite spin axis. Structural members 24 extend between positioning means 22 and the satellite cover.

Figure 2:
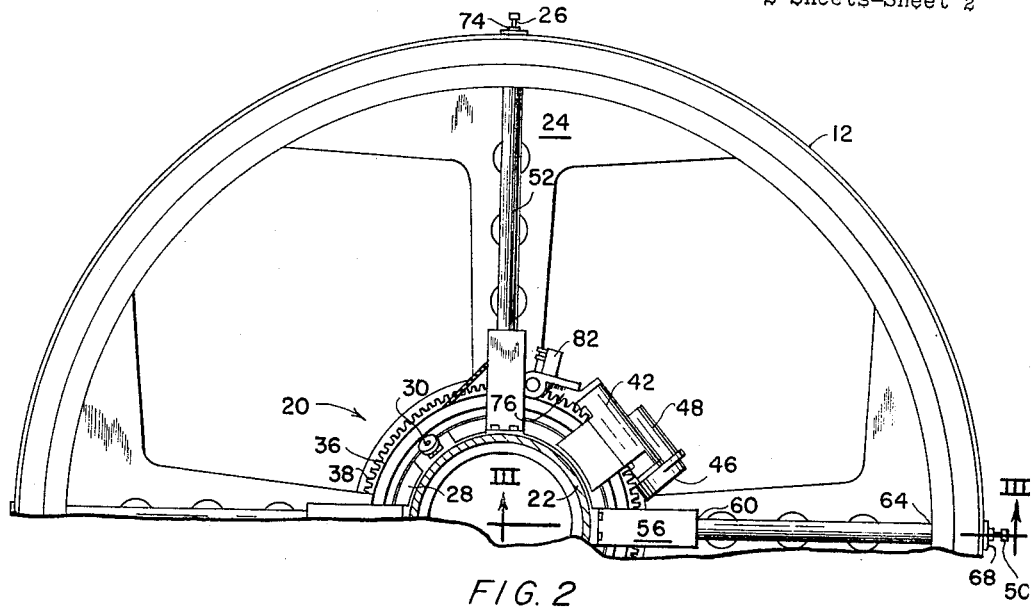
FIGURE 2 is a detail plan view, in section, of the satellite of FIGURE 1 taken along the equatorial plane.
Figure 3:
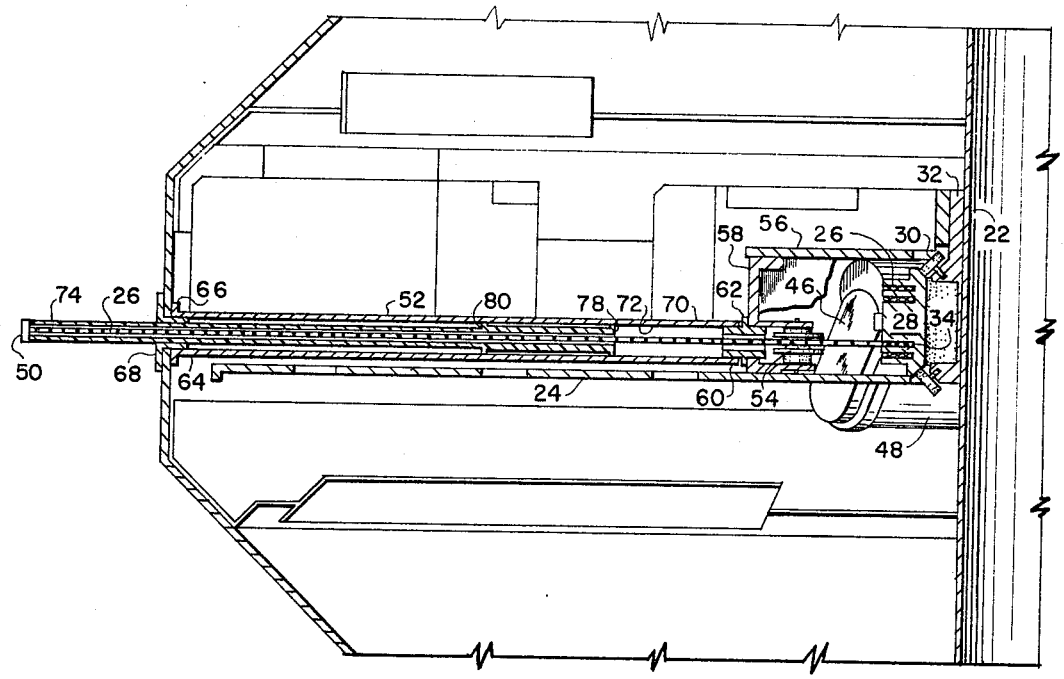
FIGURE 3 is a detail side elevational view of the device of FIGURE 2 taken on line III—III thereof.

Referring now to FIGURE 2, wherein is shown a detail cross-sectional view of the satellite of FIGURE 1 embodying the present invention, the section being taken generally along the equatorial plane of the satellite, reference also being had to FIGURE 3 for clarity, which figure is a detail cross-sectional view of the satellite of FIGURE 1 taken on a plane passing through the poles. Four wires 26 of equal length (the length used to date has been 12 feet so as to obtain a ¼ wave length characteristic) are wound on a common spool or ring 28, which is rotatably supported on positioning means 22 through mounting ring 28 by six ball bearing assemblies 30 comprising three sets of two, symmetrically located and inclined at 45° to the satellite spin axis on mounting ring 32 as best seen in FIGURES 2 and 3 (only one bearing being visible in FIGURE 2, the other two sets being positioned in the omitted portion of the drawing). Extending around spool 28 in vertically spaced relationship are grooves 34, as best seen in FIGURE 3, one groove being provided for each antenna wire 26. As shown most clearly in FIGURE 3, the grooves 34 provide only a minimum clearance for antenna wires 26 so that each wire is wound in its respective groove in a spiral. Rigidly attached to spool 28 and extending therearound is a ring gear 36 having teeth 38 oriented toward the outboard side of the satellite. In operative engagement with ring gear 36 through gear teeth 38 is worm gear 40 (illustrated in the cutaway view of FIGURE 1) having a housing 42 to prevent contamination and provide lubrication in a known manner, the housing being fixedly secured to mounting ring 32 in any convenient manner as by screws 44 through housing cover 42. Worm gear 40 is driven electrically through reduction gear train 46 (only the housing of which is shown) by release motor 48. Obviously, on activation of motor 48, the gear train 36–40–46 is caused to operate, which results in the desired rotational motion or torque of spool 28, which in turn results in winding or unwinding of the antenna wires 26 thereon.

When satellite spin begins prior to launching, a small negative (winding-in) torque is provided by release motor 48 to insure that antenna wires 26 do not creep out and strike the shroud of the carrier vehicle under the effects of spin and vibration. Under this small negative torque, spool 28 is blocked from turning by small weights 50 on the antenna tips which cannot enter the wire passages of guide tube 52.

From spool 28, the antenna wires 26 extend outwardly and pass around guidespool 54 (FIGURE 3), which is rotatably mounted on structural channel member 24 and is covered by antenna guide covers 56 and 58 which prevent accidental entry of foreign objects. After passing around guidespool 54, the antenna wire enters guide tube 52. This tube forms a guide passage as well as a structural reinforcement between the central portion of the satellite body and mounting ring 32 and shroud 12, and comprises an inner end 60 having flange 62 in abutment with guide cover 58 and an outer end 64 provided with flange 66 which is secured to the inside of shroud 12. On the extreme outer end of guide tube 52 and in abutment therewith is positioned washer 68 which is secured to the outside of shroud 12. The tube is formed as a shell 70 having a smooth inner surface 72 throughout substantially its entire length.

Positioned within guide tube 52 is damping tube 74 which is slidably, telescopically received within the guide tube and is substantially the same length as the guide tube.

On reaching the desired orbit or other trajectory desired, the final stage 14 is separated by any known means, during which time the small negative torque transmitted to antenna spool 28 by release motor 48 is maintained for a sufficiently long period to permit adequate separation of the satellite body 10 and last stage 14 to insure that the antenna wires 26 will clear stage 14 during the unwinding period. At the appropriate time, a timer (not shown) operates switching device 76 (FIG. 2) which in turn reverses motor 48, releasing the negative torque and causing worm gear 40 to begin the unwinding operation. Motor 48 causes the antenna to unreel at a constant predetermined rate to achieve the despin desired.

As the antenna wires are unreeled, damping tube 74 is permitted to move outwardly since it is no longer restrained in its retracted position by tip weights 50 on the antenna. As best seen in FIGURE 3, damping tube 74 is provided on its inner end with guide and alignment means 78, 80 which rides along the guide tube inner surface 72 and is stopped in its extended position by abutment against the inner end of washer 68. Since the damping tube is positioned on the wires in the area of maximum bending, it achieves the highest energy dissipation rate with a minimum mass.

Although any material having a relatively high energy dissipation rate is suitable as a damping tube, it has been found that tetrafluoroethylene gives excellent results in both increasing energy dissipation and in permitting smoothness of action. The telescoping feature of the damping tubes accomplishes a very important function in addition to maintaining minimum dimensions of the satellite body 10 (and consequently the protective shroud or cover prior to injection), this function being to reduce to a minimum the starting load on release motor 48. This is possible because the masses of the damping tubes 74, antenna wires 26 and antenna tip weights 50 constitute, under acceleration, a force which exceeds the inertial and static friction resistance of spool 28 to turning.

The extension of antenna wires 26 at a controlled rate serves a twofold purpose, as briefly mentioned above, in that it effects satellite despin during the extension perod due to the controlled change in the moment of inertia of the body. Such controlled antenna extension rate thus permits spin rate stabilization to the desired rate as well as effective damping of nutational motion, both results being achieved substantially without additional cost, weight, mechanism or mechanical systems.

Unreeling of the antenna wires 26 is terminated at the proper point by a cut-off mechanism or switching device 76 activated by depth gauge 82 (shown schematically in FIGURE 2) which continuously monitors the depth of wire 26 remaining in the spool groove 34. When the groove depth indicates that the proper amount of wire has been extended, release motor 48 is stopped. Simultaneously, the transmitter (not shown) is switched from a dummy load to the turnstile antenna system.

It is obvious that means other than that enumerated could be used for extending the antenna wires, or for locking them in their retracted position prior to use, the particular system shown and described being by way of example only as a proven and highly efficient means.

It must also be apparent that any antenna wire 26 having the desired characteristics could be employed. But by way of example, it has been found that an antenna wire of 0.085 inch outside diameter comprising a twisted Fiberglas core of 0.035 inch outside diameter, 95% covered by braided silverplated copper wire to give a diameter of 0.053 inch, with a final covering jacket of extruded tetrafluoroethylene of 0.016 inch wall thickness to complete the configuration gives excellent results. It has been found that this construction obtains optimum capacity for mechanical energy dissipation and thus affords maximum damping with usable wire size, gives a wire with high resistance to bending fatigue, good creep and excellent electronic capabilities.

The only restriction on configuration of the satellite is that the moment of inertia about the spin axis must be larger than the moment of inertia about any other axis. Within this limitation, it may take any configuration.

Thus, it is readily apparent that a highly efficient, simple, lightweight and economical means has been devised to serve a twofold purpose as a telemetry receiving and transmitting means and as a satellite stabilizer which acts as a despin means and nutation damper. Such a device is of utmost importance in the sophisticated, highly complex devices in use at the present time and for the future. This has been done without any basic increase in weight, bulk, cost or complexity.

What is claimed is:

1. A method for damping nutation in a spinning satellite body comprising:
   (a) extending a flexible member outwardly from the body of the satellite to thereby effect a change in the moment of inertia of the body serving to slow the rate of spin;
   (b) holding a portion of the flexible member affixed to the body of the satellite; and
   (c) placing a member having resistance to bending at the point of greatest flexure of said flexible member whereby as said satellite nutates the flexible member and member having resistance to bending will flex, removing energy from the satellite to thereby dampen the nutation.

2. A device for stabilizing a spinning satellite body comprising:
   (a) means rotatably secured to the body of said satellite;
   (b) a flexible member having
      (1) a portion secured to said rotatable means whereby said member can be reeled around said rotatable means, and
      (2) an end extendable outwardly from said satellite; and
   (c) means associated with said flexible member for creating resistance to bending at the point of greatest flexure whereby bending of said member and said means, induced by nutation of said satellite body, absorbs energy from said body to thereby dampen said nutation.

3. A device for stabilizing a spinning body comprising:
   (a) spool means rotatably secured to the body of said satellite;
   (b) a plurality of flexible members each having
      (1) a portion secured to said spool means whereby said member can be reeled around said spool mean, and
      (2) an end extendable outwardly from said satellite; and
   (c) means associated with said flexible member for creating resistance to bending at the point of greatest flexure whereby bending of said member and said means, induced by nutation of said satellite, absorbs energy from said body to thereby dampen said nutation.

4. A device for stabilizing a spinning satellite body according to claim 3 wherein said flexible members are antenna wires.

5. A device for stabilizing a spinning satellite body according to claim 3 wherein said means associated with said flexible members comprises a Teflon tube surrounding said flexible member at the point at which said member is extendable outwardly from said satellite body.

6. A device for stabilizing a spinning satellite body comprising:
   (a) spool means rotatably secured to the body of said satellite;
   (b) a plurality of flexible antenna wires having
      (1) a portion secured to said spool means whereby said wires can be reeled around said spool means, and
      (2) an end extending outwardly from said satellite; and
   (c) a Teflon tube surrounding said wires at the point at which said wires extend outwardly from said satellite body whereby bending of said wires and Teflon tube, induced by nutation of said satellite, absorbs energy from said body to thereby dampen said nutation.

References Cited by the Examiner

UNITED STATES PATENTS

| 2,714,161 | 7/1955 | Featherstun. | |
| 2,835,548 | 5/1958 | Baumann | 343—705 |
| 2,984,441 | 5/1961 | Dalmasso | 174—42 |
| 3,077,599 | 2/1963 | Mitchum | 343—871 |
| 3,098,229 | 7/1963 | Raabe | 343—705 |
| 3,104,080 | 9/1963 | Fischell | 343—705 |
| 3,105,866 | 10/1963 | Little | 174—42 |

OTHER REFERENCES

Space Technology, 2:18, July 1959, TL 787 S. 56.

Parkee: Tiros I Spin Stabilization Astronautics, 5:38, 106, June 1960, TL 787 A82.

ELI LIEBERMAN, *Acting Primary Examiner.*

HERMAN KARL SAALBACH, *Examiner.*